(12) United States Patent
Jang (10) Patent No.: US 9,118,509 B2
(45) Date of Patent: Aug. 25, 2015

(54) COMMUNICATION METHOD OF GATEWAY DEVICE SUPPORTING MUTUAL COMMUNICATION OF CAN AND MODBUS AND GATEWAY DEVICE USING THE SAME

(75) Inventor: Sung Jin Jang, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 539 days.

(21) Appl. No.: 13/531,224

(22) Filed: Jun. 22, 2012

(65) Prior Publication Data

US 2012/0327939 A1 Dec. 27, 2012

(30) Foreign Application Priority Data

Jun. 27, 2011 (KR) .................. 10-2011-0062550

(51) Int. Cl.
*H04L 12/28* (2006.01)
*H04L 12/66* (2006.01)
*H04L 12/40* (2006.01)

(52) U.S. Cl.
CPC ....... *H04L 12/66* (2013.01); *H04L 2012/40215* (2013.01); *H04L 2012/40228* (2013.01)

(58) Field of Classification Search
None
See application file for complete search history.

(56) References Cited

U.S. PATENT DOCUMENTS

2004/0054829 A1* 3/2004 White et al. .................. 710/105
2005/0256964 A1 11/2005 Dube
2006/0031577 A1* 2/2006 Peluso et al. ................. 709/243

FOREIGN PATENT DOCUMENTS

| CN | 2847715 | 12/2006 |
|----|---------|---------|
| JP | 2008-502281 | 1/2008 |
| JP | 2010-174507 | 8/2010 |
| KR | 1020080080244 | 9/2008 |

OTHER PUBLICATIONS

Lou, et al., "Research on Designing Method of CAN Bus and Modbus Protocol Conversion Interface," 2009 International Conference on Future BioMedical Information Engineering, Dec. 2009, 4 pages.*
Japan Patent Office Application Serial No. 2012-144297, Office Action dated Sep. 9, 2013, 3 pages.
Guohuan, Lou et al., "Research on designing method of CAN bus and modbus protocol conversion interface," IEEE 2009 International Conference on Future Biomedical Information Engineering, FBIE 2009, XP031623785, p. 180-182, Dec. 13, 2009.
Lou Guohuan et al., "Research on Designing Method of CAN Bus and Modbus Protocol Conversion Interface", 2009 International Conference on Future BioMedical Information Engineering, Dec. 2009.

* cited by examiner

*Primary Examiner* — Kwang B Yao
*Assistant Examiner* — Hardikkumar Patel
(74) *Attorney, Agent, or Firm* — Lee, Hong, Degerman, Kang & Waimey (57) ABSTRACT

A gateway device is provided. The gateway device for relaying communication between an automotive network communication device and an industrial field bus communication device includes: a Controller Area Network (CAN) input unit for receiving a CAN input data frame from an external; and a conversion unit for converting the received CAN input data frame into a Modbus output data frame according to a predetermined method.

14 Claims, 6 Drawing Sheets

COMMUNICATION METHOD OF GATEWAY DEVICE SUPPORTING MUTUAL COMMUNICATION OF CAN AND MODBUS AND GATEWAY DEVICE USING THE SAME

CROSS-REFERENCE TO RELATED APPLICATIONS

Pursuant to 35 U.S.C. 119(a), this application claims the benefit of earlier filing date and right of priority to Korean Patent Application No. 10-2011-0062550, filed on Jun. 27, 2011, the contents of which are all hereby incorporated by reference herein in its entirety.

BACKGROUND

The present disclosure relates to a frame converting method for communication relay between an automotive Controller Area Network (CAN) communication network device and a Modbus communication device, i.e. one of industrial field buses, and a protocol converting gateway device using the same.

Recently, automobile-related electronics industries are growing rapidly. Also, various demands on information and multimedia playback, engine control, emission control, artificial intelligence, a safety system for controlling the safety of air bags, and an automotive system are continuously being increased.

Accordingly, in order to provide an efficient automotive system, a network bus structure that supports various functions and reduces additional dedicated lines for each function is required.

For the purpose of providing the network bus structure, automobile manufacturers require a protocol that provides a high-bandwidth, flexible, and deterministic operation. Recently, various protocols that define a wiring structure and a communication protocol of a top-level system are used recently for mechanical or electrical parts of vehicles. Among the various protocols, a CAN protocol is the most representative protocol.

Figure 1:
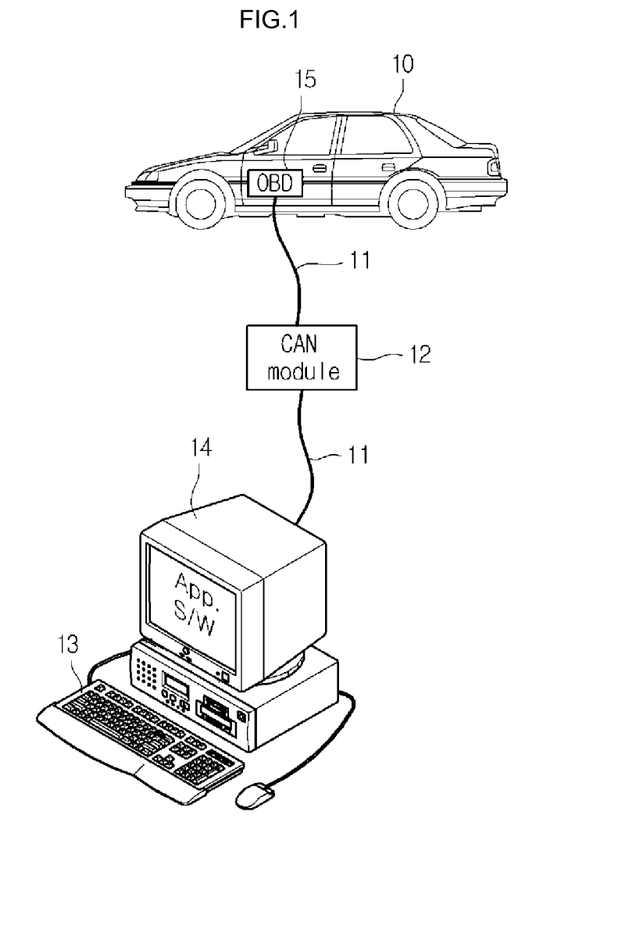
FIG. 1 is a schematic view of a related art CAN communication between a vehicle and an external device.

FIG. 1 is a schematic configuration view of a typical CAN communication 11 between a vehicle 10, i.e. a CAN communication network device, and an external device 13.

Referring to FIG. 1, the vehicle 10 typically includes an interface OBD terminal 15 for the external CAN communication 11. When the external device 10 executes an application program 14 in order to communicate with the vehicle 10, a CAN module 12 is required as a physical communication converter for the CAN communication 11. That is, in order to communicate with the vehicle 10 by using the application program 14 in an external PC or a notebook computer, the CAN module 12 compatible with the CAN communication 11 of the vehicle 10 is required.

The above related art technique does not have limitations in a general automotive network CAN communication, but is not compatible with an external network due to the extension of a network communication range when communication is made with an external device using a protocol other than a CAN communication protocol.

When communication is made with an external device using a protocol other than a CAN communication protocol, a related art technique should use the same type of a protocol as the CAN communication of a vehicle, and also use external software according thereto. However, since such external software is often programmed based on another protocol other than a CAN communication protocol, Modbus, which is the most frequently used for industrial products, has no compatibility with the CAN. Therefore, software modifications and hardware changes or network changes of typical vehicles are required for new CAN communication.

SUMMARY

Embodiments provide a gateway through which Modbus communication using a basic terminal (e.g., Serial or Ethernet) of a PC instead of hardware for CAN communication in the PC is available when an automotive CAN communication network device is communicated with a vehicle external by using a Modbus type protocol not a CAN type protocol through a PC. Therefore, existing developed Modbus S/W and devices may be used for CAN communication without changes.

In one embodiment, a gateway device for relaying communication between an automotive network communication device and an industrial field bus communication device includes: a Controller Area Network (CAN) input unit for receiving a CAN input data frame from an external; and a conversion unit for converting the received CAN input data frame into a Modbus output data frame according to a predetermined method.

In another embodiment, a communication method of a gateway device for relaying communication between an automotive network communication device and an industrial field bus communication device includes: receiving a CAN input data frame from an external; converting the received CAN input data frame into a Modbus output data frame according to a predetermined method; and outputting the converted Modus output data frame.

The details of one or more embodiments are set forth in the accompanying drawings and the description below. Other features will be apparent from the description and drawings, and from the claims.

DETAILED DESCRIPTION OF THE EMBODIMENTS

Terms or words used in this specification and claims are not interpreted being limited to common or dictionary meanings, and the inventor may appropriately define the concept of terms in order to describe his/her invention in the best way, and on the basis of that principle, the terms or words should be interpreted to meet the technical ideal of the present invention.

The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Hereinafter, embodiments of the present invention will be described below in more detail with reference to the accompanying drawings.

Figure 2:
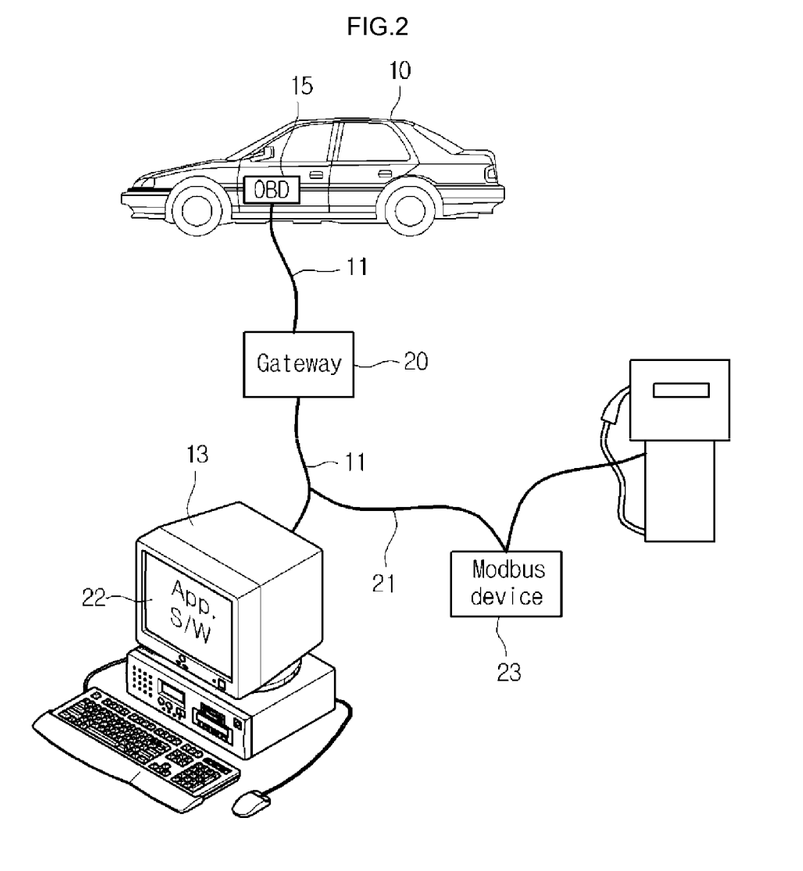
FIG. 2 is a view illustrating communication between a CAN communication network device and a Modbus communication network device through a gateway device according to the present invention.

FIG. 2 is a view illustrating communication between a CAN communication network device and a Modbus communication network device through a gateway device 20 according to the present invention.

First, referring to FIG. 2, a gateway device 20 may replace the related art CAN module 12. Additionally, the gateway device 20 may relay the CAN communication device and the Modbus communication network device 23. The CAN communication network device may be a vehicle 10. The Modbus communication network device 23 may be a device 13 that has an installed application program 22 using Modbus communication.

That is, unlike that physical communication conversion is required in order to allow the CAN communication to be compatible through the related art CAN module 12, the gateway device 20 may perform mutual conversion of the CAN communication 11 and the Modbus communication 21 without the CAN module 12. Additionally, the gateway device 20 allows the CAN communication and the Modbus communication to be smooth according to fast conversion by defining a mutual conversion process in advance.

Figure 3:
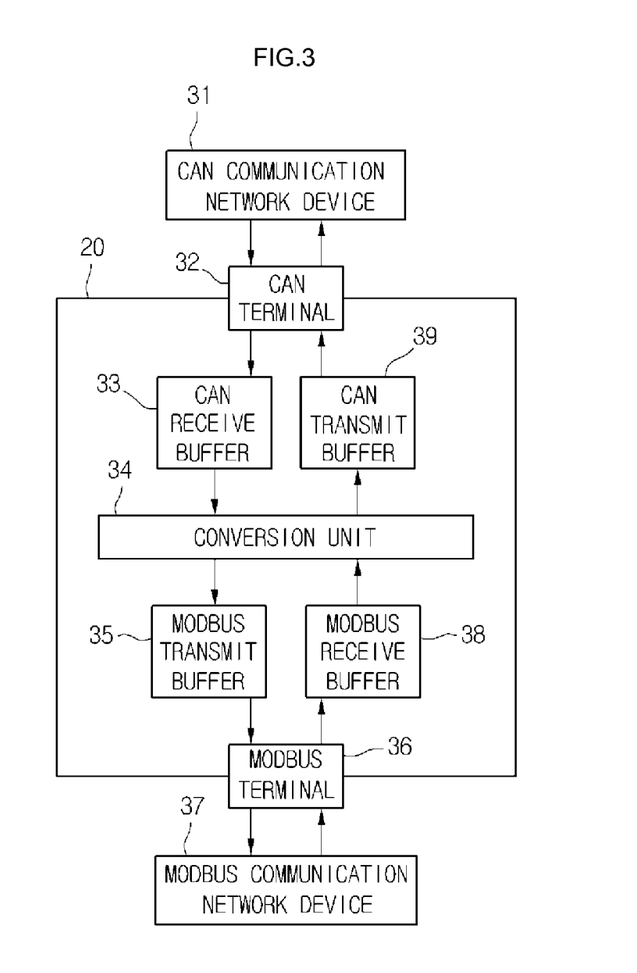
FIG. 3 is a detailed configuration view of a gateway device according to the present invention.
Figure 4:
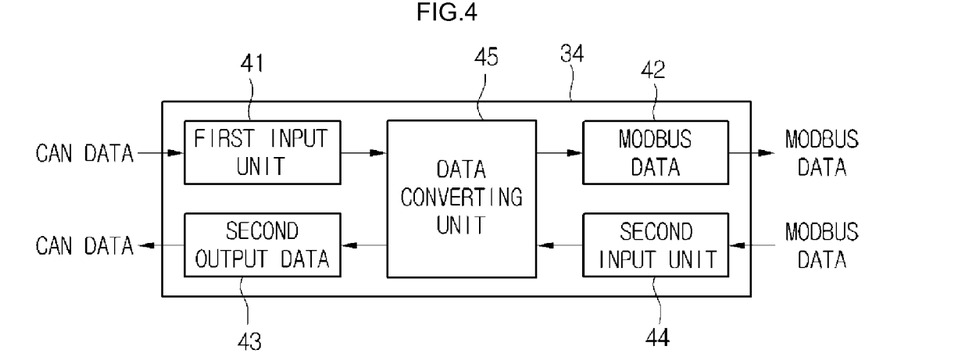
FIG. 4 is a detailed configuration view illustrating a conversion unit of a gateway device according to the present invention.

FIG. 3 is a detailed configuration view of a gateway device 20 according to the present invention. FIG. 4 is a detailed configuration view illustrating a conversion unit 34 of a gateway device according to the present invention.

Referring to FIGS. 3 and 4, when examining the gateway device 20, a CAN terminal 32 transmits/receives data to/from an external CAN communication network device 31. The CAN terminal 32 may be one of CAN data communication available protocol terminals. Versions of a communication protocol may vary.

Moreover, a CAN receive buffer 33 may store the inputted data in CAN format. The CAN receive buffer 33 may manage the stored data. Moreover, the CAN receive buffer 33 may transmit the received data to a first input unit 41.

The conversion unit 34 may convert the data in CAN format, which are received from the CAN receive buffer 33 through the first input unit 41, into the data in Modbus format. Moreover, the converted data are outputted to a first output unit 42.

Moreover, a Modbus transmit buffer 35 stores and manages the data in Modbus format, which are outputted from the first output unit 42. The Modbus transmit buffer 35 may transmit the stored data in Modbus format to a Modbus communication network device 37 through a Modbus terminal 36.

Moreover, the Modbus terminal 36 may transmit/receive data to/from the Modbus communication network device 37. The Modbus terminal 36 may be one of data communication available protocol terminals. Additionally, Versions of a communication protocol may vary.

The Modbus communication network device 37 receives the data in Modbus format, which are transmitted through the Modbus terminal 36, and performs necessary processing in order to transmit a response according thereto to the Modbus terminal 36.

The Modbus receive buffer 38 receives the response data, which are transmitted from the Modbus communication network device 37, through the Modbus terminal 36, and stores/manages the received response data. The Modbus receive buffer 38 transmits the stored response data to a second input unit 44 of the conversion unit 34.

Moreover, the conversion unit 34 converts the response data in Modbus format, which are transmitted through the second input unit 44, into the data in CAN format, and then, outputs the converted data to a second output unit 43.

The CAN transmit buffer 39 stores and manages the response data in CAN format, which are outputted from the second output unit 43. Moreover, the CAN transmit buffer 39 may transmit the stored data through the CAN terminal 32.

The CAN communication network device 31 may receive the response data in CAN format, which are transmitted through the CAN terminal 32. Accordingly, communication is performed between the CAN communication network device 31 and the Modbus communication network device 37.

Figure 5:
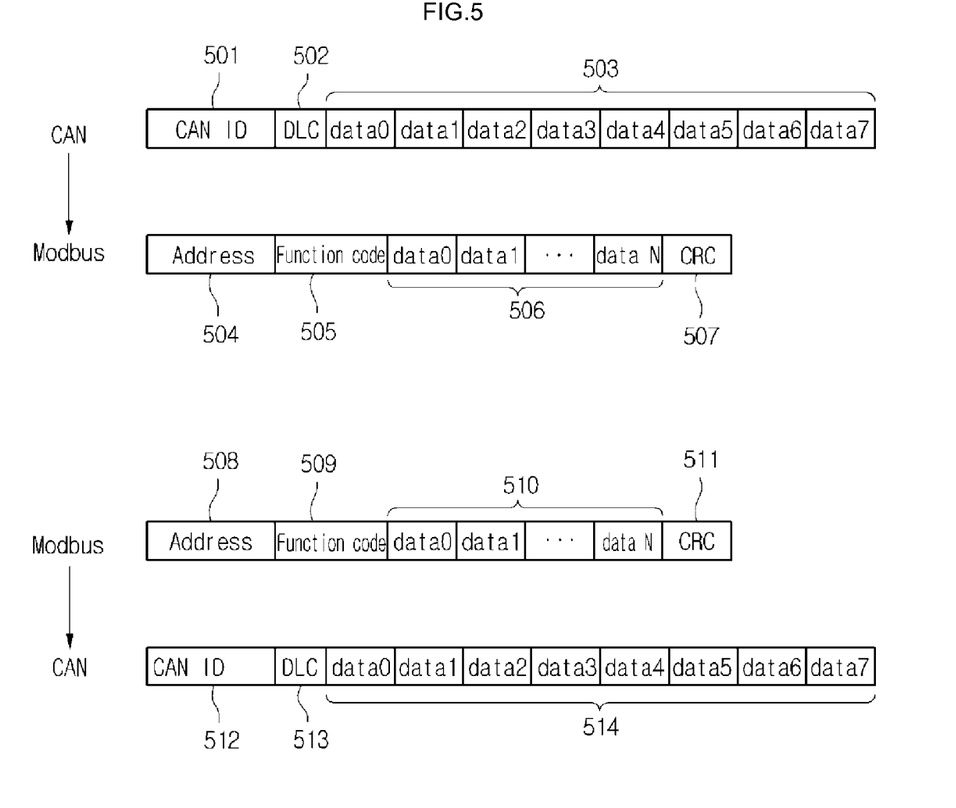
FIG. 5 is a data structure diagram illustrating a conversion process between a CAN protocol and a Modbus protocol.

FIG. 4 is the detailed configuration of the conversion unit, as mentioned above. FIG. 5 is a data structure diagram illustrating a conversion process between a CAN protocol and a Modbus protocol.

Hereafter, a data converting process will be described with reference to FIGS. 4 and 5.

Referring to FIG. 4, the conversion unit 34 includes a data converting unit 45, a first input unit 41, a first output unit 42, a second input unit 44, and a second output unit 43.

First, when examining a process for converting a CAN format into a Modbus format, the data converting unit 45 receives the data in CAN format through the first input unit 41. The first input unit 41 may be expressed as a CAN input unit.

The data converting unit 45 analyzes the inputted data in CAN format, and maps the analyzed data into the data in Modbus format in order to perform data conversion. Moreover, the data converting unit 45 generates the data in Modbus format by using the inputted data in CAN format in order to perform data conversion.

Here, the inputted data as the data in CAN format includes a first data part 501 including CAN ID, a second data part 502 including a Data Length Code (DLC), and a third data part 503 including data. For example, a CAN input data frame or an output data frame may include a CAN identifier, a DLC, and a plurality of CAN data units.

Additionally, the data in Modbus format to be outputted includes a fourth data part 504 including an address, a fifth data part 505 including a function code, a sixth data part 506 including data, and a seventh data part 507 including a Cyclic Redundancy Check (CRC) value. For example, a Modbus input data frame or a Modbus output data frame may include an address, a function code, a plurality of Modbus data units, and a CRC code.

Accordingly, the data converting unit 45 generates the fourth data part 504 including an address of a Modbus format data, and maps the first data part 501 including CAN ID into the fourth data part 504.

Accordingly, the data converting unit 45 generates the sixth data part 506 including data, and maps the third data part 503 into the sixth data part 506.

Additionally, the data converting unit 45 generates the fifth data part 505 including a function code, determines the function code according to a Modbus communication protocol in order to satisfy a data transmission purpose, and designates the determined function code of an output data frame in order to include it in the fifth data part 505.

Moreover, the data converting unit 45 performs a CRC calculation operation on the data of the third data part 503 of the inputted CAN data, according to a Modbus protocol, and generates a seventh data part by using the obtained CRC value from the CRC calculation operation.

Then, the data converting unit 45 sequentially combines the generated fourth to seventh data parts 504 to 507 to generate output data in Modbus format, and then, sequentially outputs the converted data through the first output unit 42. Accordingly, data conversion from CAN data into Modbus data is accomplished.

Moreover, when examining a process for converting a Modbus format into a CAN format, the data converting unit 45 receives the data in Modbus format through the second input unit 44.

The data converting unit 45 analyzes the inputted data in Modbus format and generates the data in CAN format in order to perform data conversion.

Additionally, according to the above configuration, the inputted data as the data in Modbus format includes an eighth data part 508 including an address, a ninth data part 509 including a function code, a tenth data part 510 including data, and an eleventh data part 511 including a CRC value.

Additionally, according to the above configuration, the data to be outputted in CAN format includes a twelfth data part 512 including CAN ID, a thirteenth data part 513 including a Data Length Code (DLC), and a fourteenth data part 514 including data.

Accordingly, the data converting unit 45 generates the twelfth data part 512 including the CAN ID of CAN format data and maps the eighth data part 508 including an address of the inputted Modbus format data into the twelfth data part 512.

Accordingly, the data converting unit 45 generates the fourteenth data part 514 including data, and maps the data of the tenth data part 510 into the sixth data part 506.

Additionally, the data converting unit 45 generates the thirteenth data part 513, and analyzes the number of bytes in the Modbus format tenth data part 510 in order to store it in the thirteenth data part 513. Here, since the maximum number of data bytes in CAN data format is 8, if the analyzed number of data byes in Modbus format is greater than 8, the data converting unit 45 sequentially divides data bytes by 8 bytes, and then, configures CAN data that are to be outputted. Furthermore, the data converting unit 45 generates a plurality of divided output data frames and sequentially outputs them.

Then, the data converting unit 45 combines the generated twelfth to fourteenth data parts 512 to 514 to generate output data in CAN format, and then, outputs the converted data through the second output unit 43. Accordingly, data conversion from Modbus format data into CAN format data is accomplished.

Figure 6:
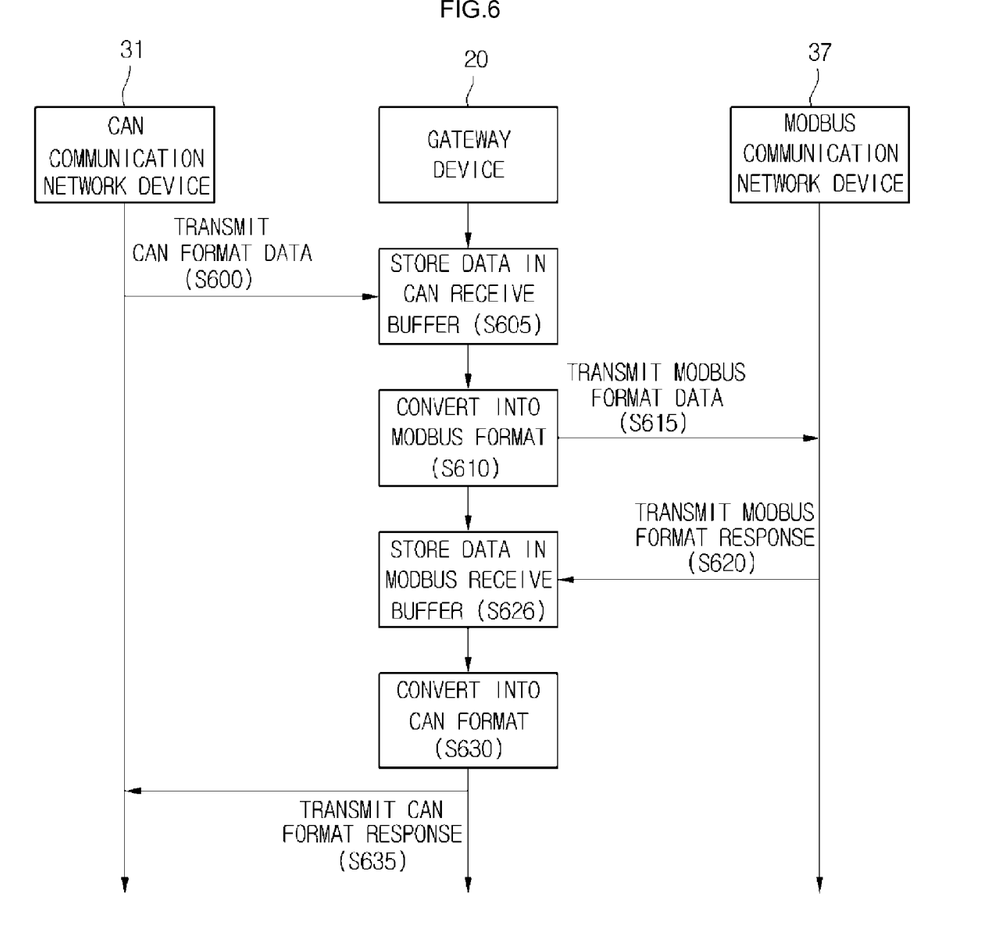
FIG. 6 is a flowchart illustrating a communication method of a gateway device according to the present invention.

FIG. 6 is a flowchart illustrating a communication method of a gateway device 20 according to the present invention.

First, a CAN communication network device 31 transmits data in CAN format into a gateway device 20 in operation S600.

Then, the gateway device 20 receives the data in CAN format and stores them in a CAN receive buffer 33 in operation S605, and converts the data stored in the receive buffer 33 into the data in a Modbus format in operation S610.

Then, the gateway device 20 transmits the converted data in Modbus format into a Modbus communication network device 37 in operation S615.

Then, the Modbus communication network device 37 performs necessary processing according to the received data, and then transmits response data according thereto to the gateway device 20 in operation S620.

Then, the gateway device 20 stores the received response data in Modbus format in a Modbus receive buffer 38 in operation S626, and converts the stored response data into data in CAN format in operation S630.

The gateway device 20 transmits the converted response data in CAN format into the CAN communication network device 31 in operation S635.

Through the above processes, communication between a CAN communication network device and a Modbus communication network device becomes available.

The gateway device between Modbus and a CAN and the communication method of the gateway device according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A gateway device for relaying communication between a Controller Area Network (CAN) communication device and a Modbus communication device, the gateway device comprising:

a CAN input unit for receiving a CAN input data frame from the CAN communication device; and a Modbus input unit for receiving a Modbus input data frame from the Modbus communication device a conversion unit for converting the received CAN input data frame into a Modbus output data frame and converting the received Modbus input data frame into a CAN output data frame; and a Modbus output unit for outputting the converted Modbus output data frame a CAN output unit for outputting the converted CAN output data frame, wherein the CAN input data frame or the CAN output data frame comprises a CAN identifier, a data length code, and a plurality of CAN data units, the Modbus input data frame or the Modbus output data frame comprises an address, a function code, a plurality of Modbus data units and a Cyclic Redundancy Check (CRC) code, wherein the conversion unit generates the address of the Modbus output data frame on a basis of the CAN identifier in the CAN input data frame when the received CAN input data frame is converted into the Modbus output data frame, generates the plurality of Modbus data units of the Modbus output data frame on a basis of the plurality of CAN data units in the CAN input data frame, generates the function code of the Modbus output data frame to correspond to a transmission purpose of the CAN input data frame, generates the CRC code of the Modbus output data frame on the basis of the plurality of CAN data units in the CAN input data frame, wherein the conversion unit analyzes a number of bytes of the Modbus input data when the Modbus input data frame is converted into the CAN output data frame, sequentially divides the Modbus input data frame by 8 bytes when the analyzed number of data bytes in the Modbus input data frame is greater than 8 bytes, and sequentially generates and outputs a plurality of divided output data frames.

2. The gateway device according to claim 1, wherein the conversion unit maps an address in the Modbus input data frame into a CAN identifier of the CAN output data frame when the received Modbus input data frame is converted into the CAN output data frame;

maps a plurality of Modbus data units in the Modbus input data frame into the plurality of CAN data units; and calculates the number of bytes of a plurality of Modbus data units in the Modbus input data and designates the calculated number as a data length code of the CAN output data frame in order to generate the CAN output data frame.

3. The gateway device according to claim 1, further comprising:

a CAN terminal for receiving data from the CAN communication device; and a CAN receive buffer for storing the received data, wherein the CAN input unit obtains the CAN input data frame by using the data stored in the CAN receive buffer.

4. The gateway device according to claim 1, further comprising:

a Modbus transmit buffer for storing the outputted Modbus output data frame; and a Modbus terminal for transmitting the stored Modbus output data frame to the Modbus communication device.

5. The gateway device according to claim 1, further comprising:

a Modbus terminal for receiving data from the Modbus communication device; and a Modbus receive buffer for storing the receive data, wherein the Modbus input unit obtains the Modbus input data frame by using the data stored in the CAN receive buffer.

6. The gateway device according to claim 5, further comprising:

a CAN transmit buffer for storing the outputted CAN output data frame; and a CAN terminal for transmitting the stored CAN output data frame to a CAN communication network device.

7. A communication method of a gateway device for relaying communication between a Controller Area Network (CAN) communication device and a Modbus communication device, the method comprising:

receiving a CAN input data frame from the CAN communication device;

converting the received CAN input data frame into a Modbus output data frame;

outputting the converted Modus output data frame;

receiving a Modbus input data frame from the Modbus communication device;

converting the received Modbus input data frame into a CAN output data frame; and outputting the converted CAN output data frame, wherein the CAN input data frame comprises a CAN identifier, a data length code, and a plurality of CAN data units, the Modbus output data frame comprises an address, a function code, a plurality of Modbus data units and a Cyclic Redundancy Check (CRC) code, wherein converting of the received CAN input data frame comprises:

generating the address of the Modbus output data frame on a basis of the CAN identifier in the CAN input data frame when the received CAN input data frame is converted into the Modbus output data frame, generating the plurality of Modbus data units of the Modbus output data frame on a basis of the plurality of CAN data units in the CAN input data frame, generating the function code of the Modbus output data frame to correspond to a transmission purpose of the CAN input data frame, generating the CRC code of the Modbus output data frame on the basis of the plurality of CAN data units in the CAN input data frame, wherein converting of the received Modbus input data frame comprises:

analyzing a number of bytes of the Modbus input data when the Modbus input data frame is converted into the CAN output data frame, sequentially dividing the Modbus input data frame by 8 bytes when the analyzed number of data bytes in the Modbus input data frame is greater than 8 bytes, and sequentially generating and outputting a plurality of divided output data frames.

8. The method according to claim 7, further comprising:

receiving a Modbus input data frame from the Modbus communication device;

converting the received Modbus input data frame into a CAN output data frame; and outputting the converted CAN output data frame.

9. The method according to claim 8, wherein the CAN output data frame comprises a CAN identifier, a data length code, and a plurality of CAN data units; and the Modbus output data frame comprises an address, a function code, a plurality of data units, and a Cyclic Redundancy Check (CRC) code.

10. The method according claim 8, wherein the converting of the received Modbus input data frame into the CAN output data frame comprises:

mapping an address in the Modbus input data frame into a CAN identifier of the CAN output data frame;

mapping a plurality of Modbus data units in the Modbus input data frame into the plurality of CAN data units; and calculating the number of bytes of a plurality of Modbus data units in the Modbus input data and designating the calculated number as a data length code of the CAN output data frame.

11. The method according to claim 7, further comprising:

receiving data from the CAN communication device;

storing the received data in a buffer; and obtaining the CAN input data frame by using the data stored in the buffer.

12. The method according to claim 7, further comprising:

storing the outputted Modbus output data frame in a buffer; and transmitting the stored Modbus output data frame to the Modbus communication device.

13. The method according to claim 8, further comprising:
receiving data from the Modbus communication device;
storing the received data in a buffer; and
obtaining the Modbus input data frame by using the data stored in the buffer.

14. The method according to claim 8, further comprising:
storing the outputted CAN output data frame in a buffer; and
transmitting the stored CAN output data frame into the CAN communication device.

* * * * *